United States Patent [19]

St. Clair

[11] Patent Number: 5,745,493
[45] Date of Patent: Apr. 28, 1998

[54] METHOD AND SYSTEM FOR ADDRESSING MULTIPLE COMPONENTS ON A COMMUNICATION BUS

[75] Inventor: Joe Christopher St. Clair, Round Rock, Tex.

[73] Assignee: International Business Machines Corporation, Armonk, N.Y.

[21] Appl. No.: 560,917

[22] Filed: Nov. 20, 1995

[51] Int. Cl.$^6$ ........................................ H04Q 1/30
[52] U.S. Cl. .................. 370/438; 370/463; 307/41; 340/825.07; 340/825.52
[58] Field of Search ........................ 370/257, 438, 370/439, 449, 462, 463; 307/41; 340/825.07, 825.08, 825.52

[56] References Cited

U.S. PATENT DOCUMENTS

| | | |
|---|---|---|
| 4,642,473 | 2/1987 | Bryant . |
| 4,744,080 | 5/1988 | Brennand et al. . |
| 4,791,358 | 12/1988 | Sauerwald et al. . |
| 4,847,615 | 7/1989 | McDonald ............... 340/825.02 |
| 4,849,752 | 7/1989 | Bryant ..................... 340/825.52 |
| 4,879,717 | 11/1989 | Sauerwald et al. . |
| 4,937,816 | 6/1990 | van Steenbrugge et al. . |
| 5,128,936 | 7/1992 | van Steenbrugge et al. . |
| 5,249,182 | 9/1993 | van Steenbrugge et al. . |

*Primary Examiner*—Melvin Marcelo
*Attorney, Agent, or Firm*—Richard A. Henkler

[57] ABSTRACT

A method and system for sequentially addressing multiple components, having a limited number of externally available address lines, on a communication bus. The method and system employs an addressing scheme in combination with a specific interconnection of the components. This combination enables each of the components to be addressed in a sequential fashion by dynamically altering their address. Thus, allowing a virtually unlimited number of components to be coupled to the communication bus without the traditional concerns over the number of externally available address lines.

14 Claims, 4 Drawing Sheets

Status Table
300

| I²C commands | Expander 104 | | Expander 104a | | Expander 104N | |
|---|---|---|---|---|---|---|
| | Address | PO | Address | PO | Address | PO |
| Reset | 76 | 1 | 76 | 1 | 76 | 1 |
| 76H, FEH | 74 | 0 | 70 | 0 | 70 | 0 |
| 74H, ... | Access | | | | | |
| 74H, FFH | 76 | 1 | 74 | 0 | 70 | 0 |
| 74H, ... | | | Access | | | |
| 74H, FFH | 76 | 1 | 76 | 1 | 74 | 0 |
| 74H, ... | | | | | Access | |
| 74H, FFH | 76 | 1 | 76 | 1 | 76 | 1 |
| At this point we are back at reset state and can repeat the process | | | | | | |
| 76H, FEH | 74 | 0 | 70 | 0 | 70 | 0 |
| etc. | | | | | | |

FIG. 3

METHOD AND SYSTEM FOR ADDRESSING MULTIPLE COMPONENTS ON A COMMUNICATION BUS

BACKGROUND

1. Field of the Present Invention

The present invention generally relates to communication buses, and more specifically to communication buses which utilize addressing schemes to access multiple components.

2. History of Related Art

In the design of data processing systems it is often desirable to interface and control miscellaneous devices. These devices may be, for example, indicators on control panels, temperature sensors, and power supplies. Communication with these devices is typically not time critical, and therefore, a low speed bus is often applicable. One such low speed bus employed in such an application is the I²C bus produced by Phillips Semiconductors. A problem usually encountered with such low speed buses is the number of components capable of being addressed. The problem arises from the typical factory design of such components in which only a limited number of address lines are externally available for designers. Thus, the addressability of such components is directly related to the number of address lines available. For example, if a component usually only has two address lines externally available, then only four such components can be coupled and addressed on the bus, if only three external address lines were available, then only eight such components, and so on.

It would, therefore, be a distinct advantage to have a method and apparatus which would allow a virtually unlimited number of components to be coupled to a bus without the traditional concerns over the number of available address lines. The present invention provides such a method and apparatus.

SUMMARY OF THE PRESENT INVENTION

The present invention allows multiple components to be connected to a communication bus without the traditional concerns over the number of externally available address lines for each of the components. In general, this is accomplished by providing each of the components with the ability to dynamically alter their address according to an organizational scheme.

In one aspect, the present invention is a method of addressing a chain of units coupled to a communication bus. The method includes the step of dynamically altering, in response to receiving a reset command, each one of said units to have a reset address. The method further includes dynamically altering, in response to receiving an access command, a first one of the units to have an access address. The method also includes the step of dynamically altering, each time a unit having an access address receives a sequential command, the receiving unit to have a reset address and the next succeeding unit to have the access address.

BRIEF DESCRIPTION OF THE DRAWINGS

The present invention will be better understood and its numerous objects and advantages will become more apparent to those skilled in the art by reference to the following drawings, in conjunction with the accompanying specification, in which:

FIG. 3 is a Status Table illustrating the status for each of the Expanders during the transmission of various commands on the communication bus of FIG. 1 according to the teachings of the present invention.

DETAILED DESCRIPTION OF THE PREFERRED EMBODIMENT OF THE PRESENT INVENTION

Figure 1:
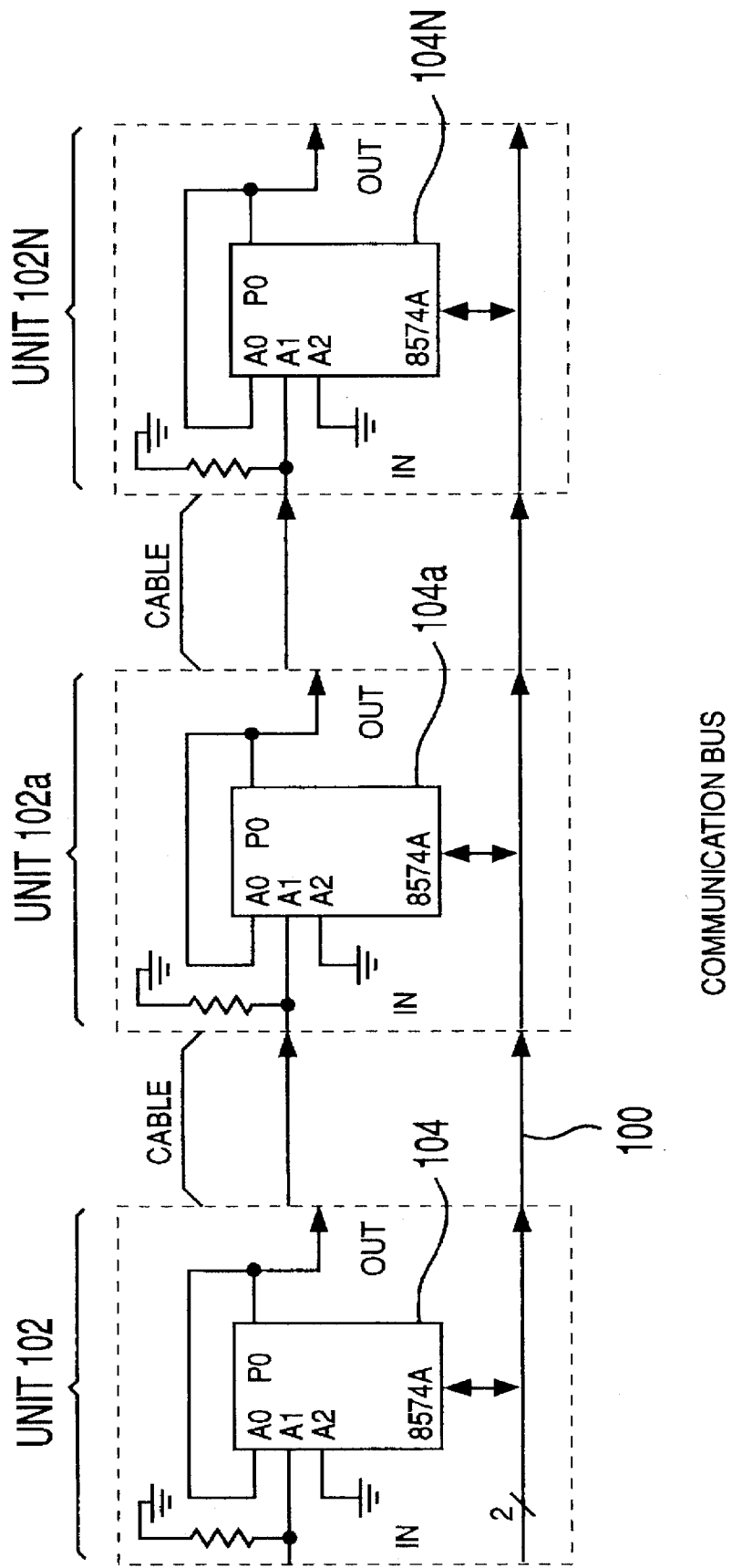
FIG. 1 is a schematic diagram illustrating a plurality of Circuit Units having Expanders which are interconnected one to another according to the teachings of the present invention.

Reference now being made to FIG. 1, a schematic diagram is shown illustrating a plurality of Circuit Units 102–102n interconnected one to another according to the teachings of the present invention. Each of the Circuit Units 102–102n include a parallel Input/Output Expander 104–104n, respectively. Communication with each of the Circuit Units 102–102n is provided via Communication Bus 100 which is bi-directionally coupled to each of the Expanders 104–104n. In the preferred embodiment of the present invention, Communication Bus 100 is a low speed (100K bit/sec to 400K bit/sec) serial bus, such as the I²C bus developed by Phillips Semiconductors. It should be noted, however, that the applicability of the present invention is not limited solely to a low speed bus, but is equally applicable to buses of varying speeds, especially, where the ability to add multiple components to the bus is limited by the available address lines of the components. A general description of the I²C bus is provided hereinafter to better clarify the various functions provided thereby.

The basic I²C bus comprises a bi-directional data line signal, and a clock line signal. In general, the I²C bus provides the capability for one or more bus masters, such as micro-controllers, to access slave devices, and may be used for tasks such as reading Vital Product Data (VPD) from Read Only Memories (ROMs) on planars, interfacing to switches and indicators on control panels, environmental sensing such as temperature or power supply voltage, and controlling power supplies. More specific information concerning the I²C bus can be found in "Electronic Components and Applications", Volume 5, No. 1, November 1982, by Phillips Semiconductors, which is incorporated by reference herein.

With continuing reference to FIG. 1, in the preferred embodiment of the present invention, the parallel I/O Expanders 104–104n are 8574As produced by Phillips Semiconductors. As is typical with many such components, a predetermined number of their address lines are internally hardwired to a factory specific value, any remaining address lines are then made available to the designer for external addressing. In this embodiment, each of the Expanders 104–104n have a seven bit address with the high order bits (nibble) being internally hardwired to the value of seven (0111) while the remaining upper three bits A2-A0 of the lower nibble are made available to the designer for external addressing.

It should be noted that the I²C bus 100 protocol utilizes the lowest address bit of the lower nibble for indicating whether the data transmitted is to be read or written to the addressed component. In this embodiment, the addresses of the Expanders 104–104n are represented as though data is constantly being written thereto, and therefore, the value of the lowest address bit (not shown) remains at zero.

The addressing scheme employed by the preferred embodiment of the present invention provides the capability to have a virtually unlimited (restrained only by electrical load considerations) number of Expanders 104–104n connected to the I²C bus 100 without regards to limitations on the addressing thereof. More specifically, if the three available A0–A2 address bits were typically assigned unique address values for each Expander, then the maximum number of Expanders would be limited to $2^3$ or 8.

However, in the preferred embodiment of the present invention an addressing scheme is employed in lieu of unique address values. As can be seen from FIG. 1, the Expanders 104–104n are interconnected one to another in a sequential or chaining fashion. Specifically, each of the Expanders 104–104n are interconnected so that each of their A1 address lines are connected to the output line P0 of the preceding Expander 104–104N, with the exception of the initial Expander 104 of the chain. In addition, each of the Expanders 104–104n have their address line A0 connected to their output line P0, and their address line A2 at a constant value of zero (via the hard wiring of the address line to ground). This type of interconnecting enables the addressing of the Expanders 104–104n in a fashion which is independent of the number of address lines externally available. The method for addressing each of the Expander 104–104n is explained in detail below.

Figure 2:
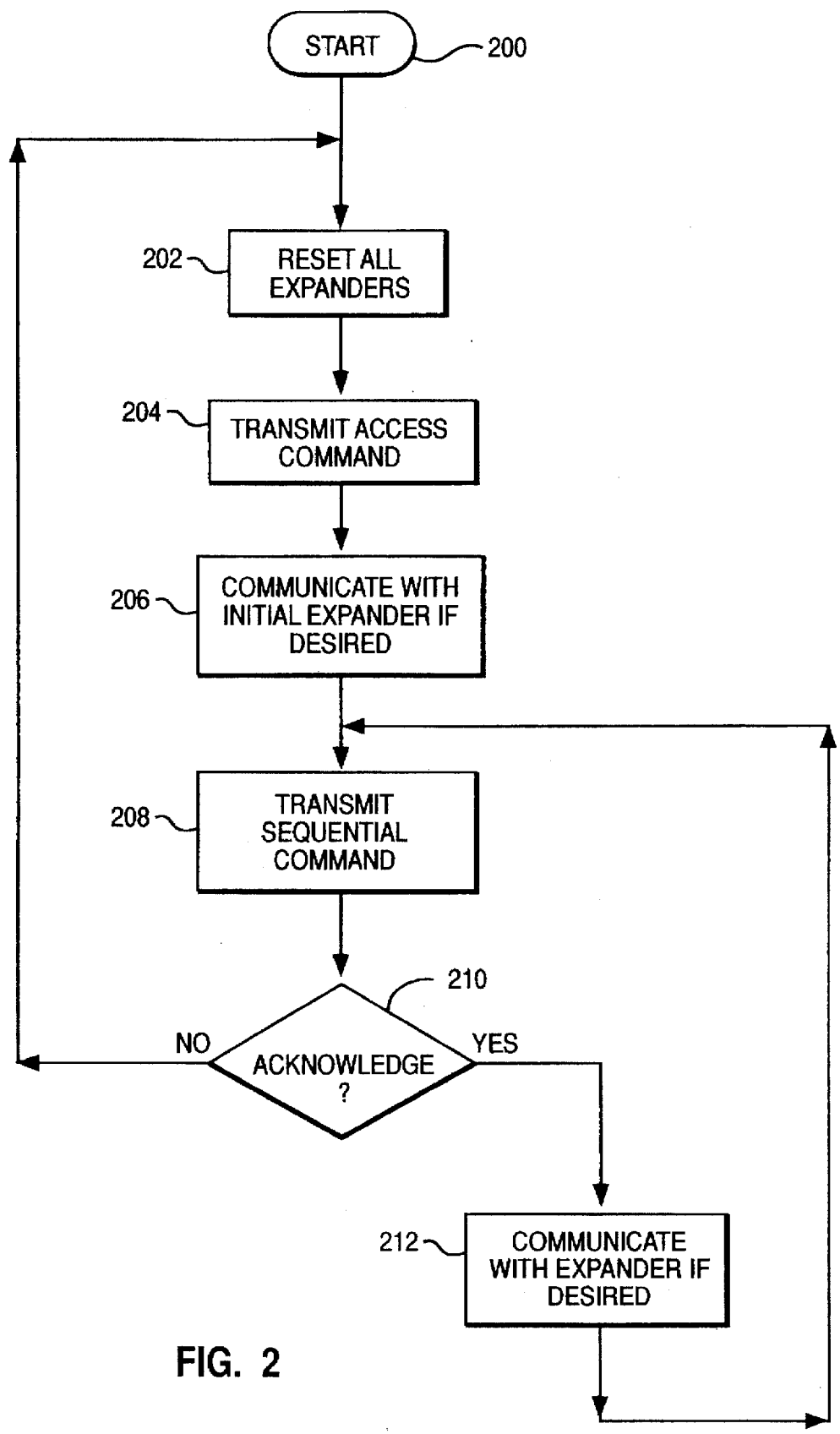
FIG. 2 is a flow chart illustrating the steps comprising a method for accessing the chain of Expanders of FIG. 1 according to the teachings of the present invention.

Hereinafter, FIGS. 2–3 are referenced and explained together in order to better exemplify the present invention. Reference now being made to FIG. 2, a flow chart is shown illustrating the steps comprising a method for accessing the chain of Expanders 104–104n of FIG. 1 according to the teachings of the present invention. The addressing of the Expanders 104–104n by, for example, a service controller (not shown) is accomplished, at step 200, by first transmitting, via the I²C bus 100, a Reset command to each Expander 104–104n. Upon receiving the Reset command each of the Expanders 104–104n assumes an address having a hexadecimal value of 76H, hereinafter hexadecimal representations are identified by the designation H after the value.

Reference now being made to FIG. 3, a Status Table 300 is shown illustrating the status for each of the Expanders 104–104 N during the transmission of various commands on the I²C bus of FIG. 1 according to the teachings of the present invention. The altering of each of the Expander's 104–104n address in response to the receipt of the Reset command is illustrated by entry 302. As illustrated by entry 302, each of the Expanders 104–104n have assumed an address having a value of 76H, and each of their respective output lines P0 have a value of one.

Returning now to FIG. 2, the method then proceeds to step 204 where the service processor transmits an Access command having a value of FEH to address 76 H. Since each of the Expanders 104–104n have assumed the address of 76H they each receive the Access command. In response thereto, Expander 104 (the initial expander of the chain) assumes an address of 74H and its output line P0 assumes a value of 0. In accordance with their connections from one another, the remaining Expanders 104a–104n assume a parking address having a value of 70H, and their respective output lines P0 a value of 0. This is exemplified in entry 304 of FIG. 3.

Thereafter, the method proceeds to step 206 where the service processor may communicate, if it so desires, with the Expander having the address of 74H. In this example, Expander 104 has an address of 74H. Status Table 300 entry 306 illustrates an example in which the communication is held with Expander. Thereafter, the method proceeds to step 208 where the service processor transmits a Sequential command having a value of FFH to address 74H. In this case, Expander 104 receives the Sequential Command and according to the chain configuration alters its address to have a value of 76H, and outputs a value of 1 on its output line P0. As a consequence of having their address line A1 coupled to the output line P0 of the previous Expander, Expander 104a assume an address of 74H, and any remaining Expanders 104b–n assumes an address of 70H. Status entry 308 represents this scenario.

At this point, it should be noted that each time a command is received by an Expander 104–104n it issues an acknowledgement signal back to the service processor. The method then proceeds to step 210 where this acknowledgement signal is checked to determine whether any of the Expanders 104–104n responded to the the Sequential command. If an acknowledgement signal was not returned to the service processor, then it is assumed that communication with the last Expander 104n in the chain has ceased.

In accordance with the addressing scheme of the present invention, any further communication with Expanders 104–104n must resume in a sequential fashion starting first with the initial Expander 104. If, however, an acknowledgement signal is returned, then it is assumed, that subsequent Expanders 104–104n exist and which can be addressed using the sequential command. The above analysis is represented by the determination at step 210. If, at step 210, it is determined that an acknowledgment signal was returned, then the method proceeds to step 212. If, however, it is determined, at step 210, that an acknowledgment signal was not returned, then the method proceeds back to step 202 and repeats the above noted steps from that point.

In this particular example, Status table entries 312–316 represent the assumption that an additional Expander 104n exists after Expander 104a, and that Expander 104n is the final Expander of the chain. Upon examination of Status Table 300, it should be noted that any Expander 104–104n which is to be accessed has an address of 74H, while any Expander 104–104n which has already been accessed has an address of 76H, and any Expander 104–104n to be addressed later has an address of 70H until the method returns to step 202. At which time, all Expanders 104–104n assume an address of 76H. It should also be understood that if communication is to be held with only a single Expander 104–104n and the Expander 104–104n has been addressed, either as the first in the chain or via the sequence command, the chain of Expanders 104–104n may be optionally reset as explained in connection with step 202.

Figure 4:
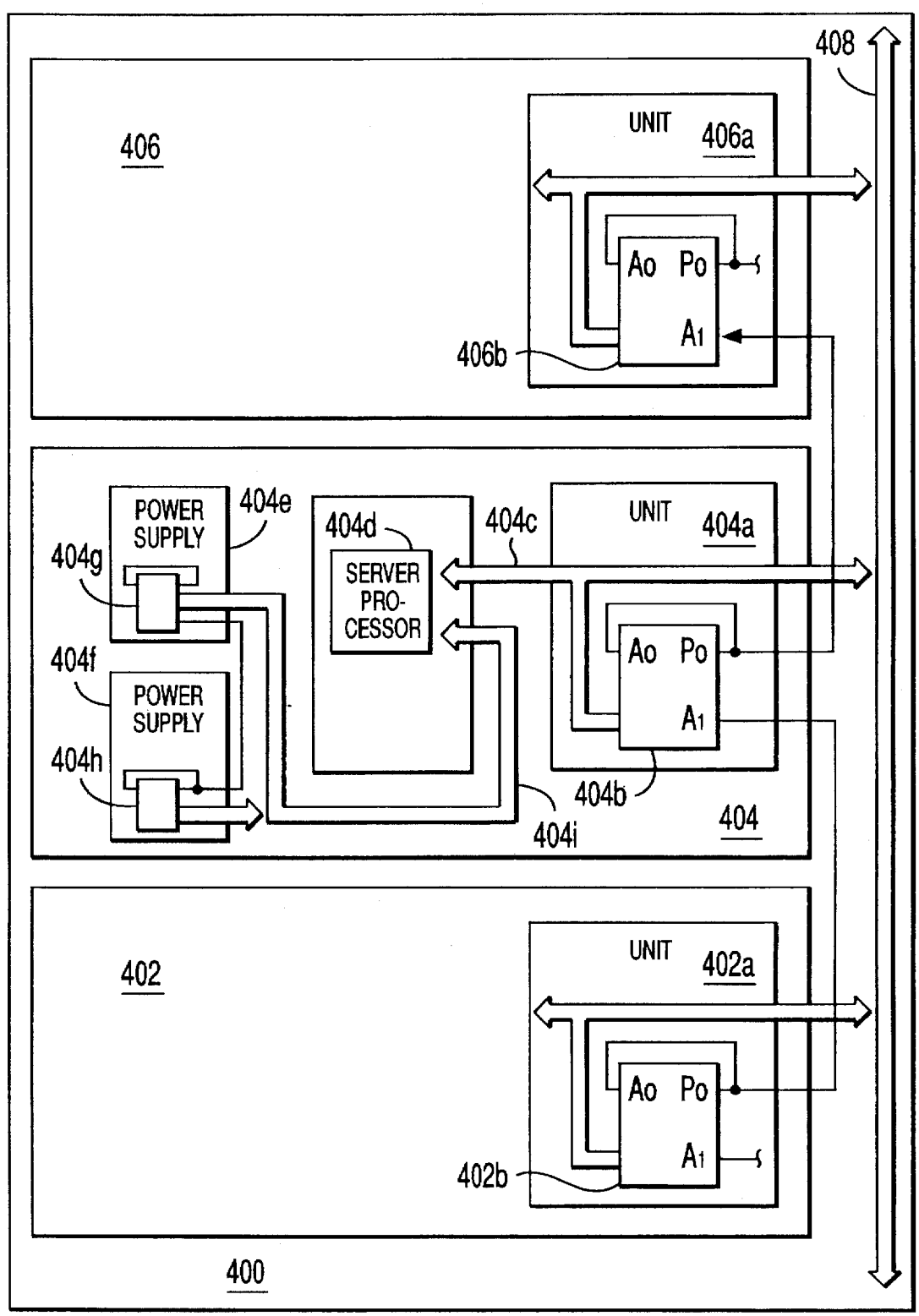
FIG. 4 is a schematic diagram of a data processing system in which the present invention can be practiced.

Reference now being made to FIG. 4, a schematic diagram of a data processing system 400 is shown in which the present invention can be practiced. The data processing system 400 includes three drawers 402, 404, and 406, each of which is interconnected one to another via I²C bus 408. Each of the drawers 402–406 includes a Circuit Unit 402a, 404a, and 406a, respectively. Each of the Circuit Units 402a–406a include an Expander 402b, 404b, and 406b, respectively. Each of the Expanders 402b–406b are interconnected and addressed as previously described in reference to FIGS. 1–3. Expanders 402b–406b may be used, for example, for interfacing with ROMs on planars, interfacing with switches, control panels, and environmental settings, etc .... Drawer 404 also includes a service processor 404d for controlling each of the Expanders 402b–406b and is interconnected to the I²C bus 408 via bi-directional connection 404c.

Service processor 404c is interconnected to another I²C bus 404I and is the controlling device for Expanders 404g and 404h residing within Power Supplies 404e and 404f, respectively. Expanders 404g and 404h are interconnected one to another and addressed as explained in connected with FIGS. 1–3, and may be used, for example, voltage tolerances, fan speed, etc . . . .

It is thus believed that the operation and construction of the present invention will be apparent from the foregoing description. While the method and system shown and described has been characterized as being preferred, it will be readily apparent that various changes and/or modifications could be made wherein without departing from the spirit and scope of the present invention as defined in the following claims.

What is claimed is:

1. A method of addressing a chain of units coupled to a communication bus, said method comprising the steps of:

dynamically altering, in response to receiving a reset command, each one of said units to have a reset address;

dynamically altering, in response to receiving an access command, a first one of said units to have an access address; and dynamically altering, each time a unit having an access address receives a sequential command, said receiving unit to have a reset address and the next succeeding unit to have said access address.

2. The method of claim 1 further comprising the steps of:

transmitting said reset command to each one of said units; and transmitting said access command to said first unit.

3. The method of claim 2 wherein said communication bus is a low speed bus.

4. The method of claim 3 wherein said communication bus is the I²C bus.

5. The method of claim 2 wherein each one of said units is accessed sequentially according to their position within said chain.

6. An apparatus having a communication bus for addressing a chain of units coupled to said communication bus, said apparatus comprising:

means for dynamically altering, in response to receiving a reset command, each one of said units to have a reset address;

means for dynamically altering, in response to receiving an access command, a first one of said units to have an access address; and means for dynamically altering, each time a unit having an access address receives a sequential command, said receiving unit to have a reset address and the next succeeding unit to have said access address.

7. The apparatus of claim 6 further comprising:

means for transmitting said reset command to each one of said units; and means for transmitting said access command to said first unit.

8. The apparatus of claim 7 wherein said communication bus is a low speed bus.

9. The apparatus of claim 7 wherein said communication bus is the I²C bus.

10. The apparatus of claim 7 wherein each one of said units is accessed sequentially according to their position within said chain.

11. An apparatus comprising:

a communication bus;

a first component, coupled to said communication bus, having a first address line and a first output line coupled one to another;

a second component, coupled to said communication bus, having a first and second address line and a first output line, said second component's first address line and first output line being coupled one to another, and said first component's first output line being coupled to said second component's second address line; and a third component, coupled to said communication bus, having a first and second address line and a first output line, said third component's first address line and first output line being coupled one to another, and said third component's second address line being coupled to said second component's output line.

12. The apparatus of claim 11 wherein each one of said components include at least two additional available address lines.

13. The apparatus of claim 12 wherein said communication bus is a low speed bus.

14. The apparatus of claim 12 wherein said communication bus is I²C bus.

* * * * *